UNITED STATES PATENT OFFICE.

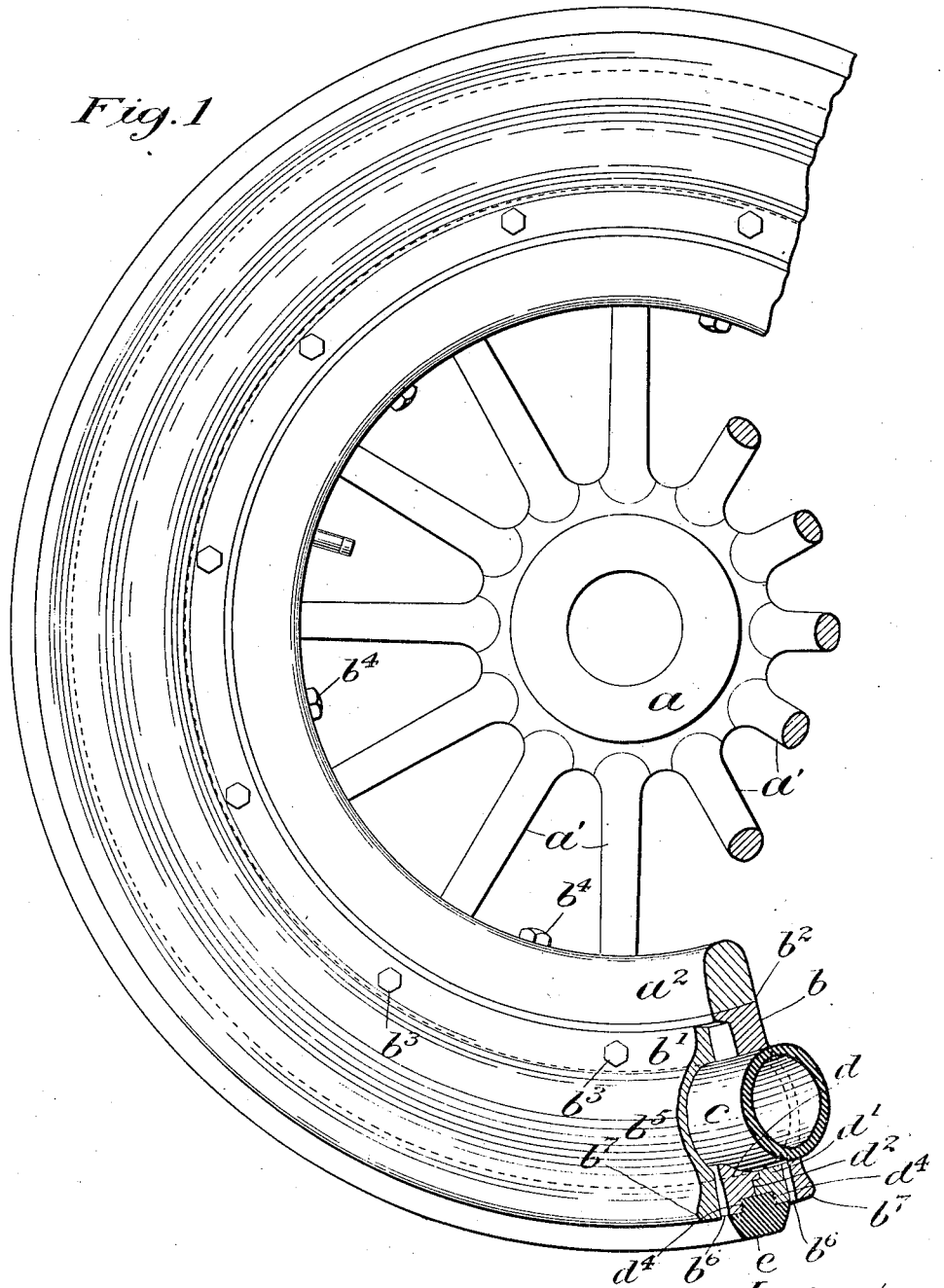

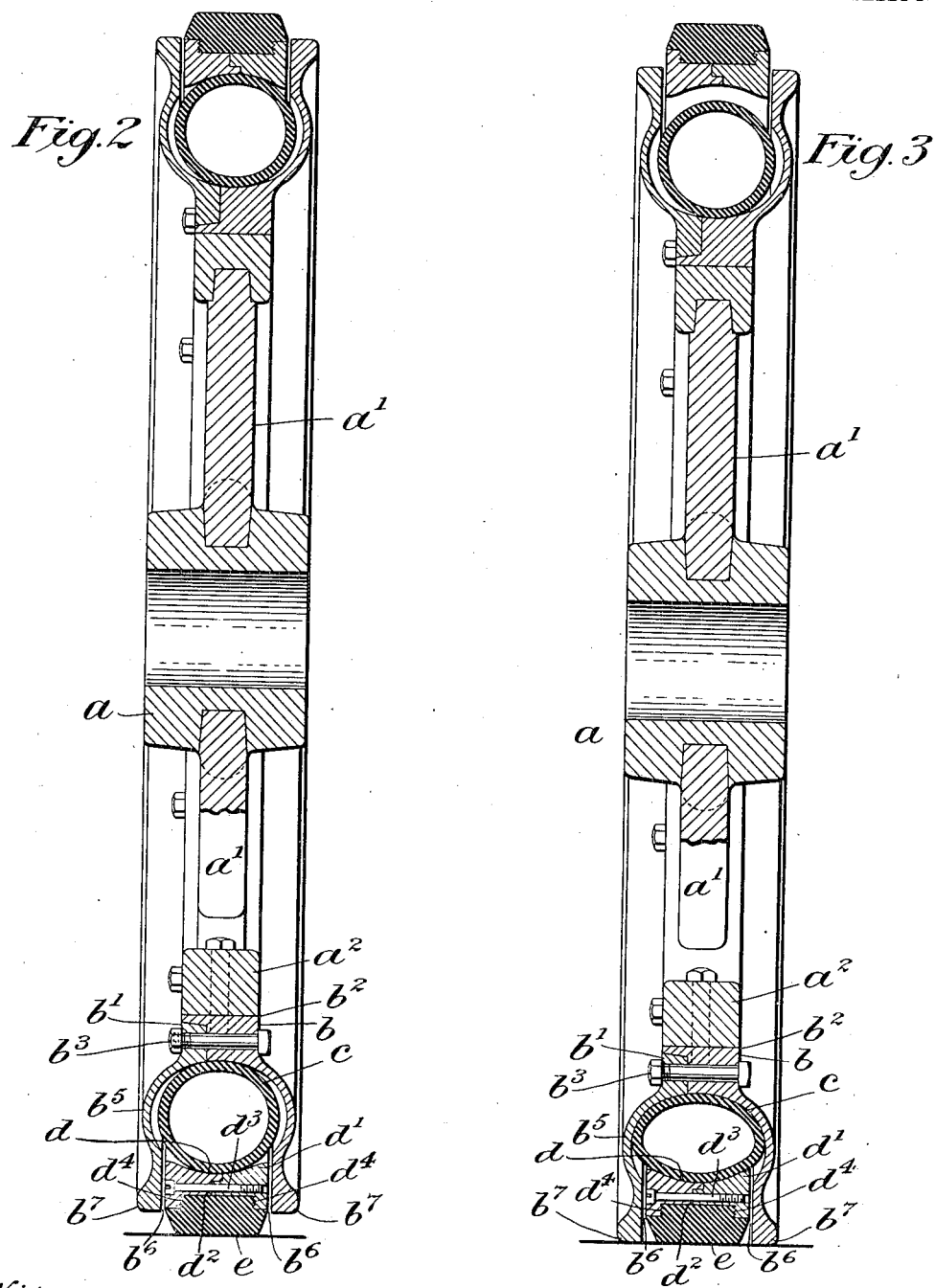

JOHN THOMSON, OF NEW YORK, N. Y., ASSIGNOR TO TRIDENT TIRE COMPANY, OF NEW YORK, N. Y., A CORPORATION OF NEW YORK.

WHEEL.

No. 837,153.   Specification of Letters Patent.   Patented Nov. 27, 1906.

Application filed November 24, 1905. Serial No. 288,832.

*To all whom it may concern:*

Be it known that I, JOHN THOMSON, a citizen of the United States, residing in the borough of Manhattan, city of New York, in the State of New York, have invented certain new and useful Improvements in Wheels, of which the following is a specification, reference being had to the accompanying drawings, forming a part hereof.

This invention relates to cushion-tired wheels for vehicles—that is, to wheels in which cushioning devices are interposed between the body of the wheel and the road-surface—and more especially to wheels of this character in which the cushion portion, or the part thereof which is chiefly relied upon for its resilience, is a pneumatic tube.

The object of the invention is to provide a simple and inexpensive construction in which the pneumatic tube shall be guarded against puncture, against excessive distortion through extraordinary load or contact of the moving wheel with an obstacle, and against wear and possible rupture through side strains when the vehicle is turning a corner or is traveling upon a laterally-inclined road-surface.

The invention will be more fully described hereinafter with reference to the accompanying drawings, in which it is illustrated as embodied in a convenient and practical form, and in which—

Figure 1 is a partial side view of a vehicle-wheel which has the present improvement applied thereto, the same being shown partly in section. Fig. 2 is a vertical central section of the wheel, the parts being represented in the relative positions which they have under normal load. Fig. 3 is a view similar to Fig. 2, but showing the relations which the parts assume under excessive load or when the moving wheel meets an obstruction.

The body of the wheel, represented by the hub $a$, the spokes $a'$, and the felly $a^2$, may be of any usual or preferred construction, the face of the felly being preferably smooth to permit the easy application and removal of a compound rim or tire, as hereinafter described. In the form of invention shown in the drawings there is applied to the felly $a^2$ a metal ring $b$, which, with its detachable member $b'$, forms a seat and a lateral guard for the pneumatic tube $c$. The ring member $b'$ is seated upon the ring member $b$, as shown at $b^2$, and may be secured thereto by bolts $b^3$, this construction affording the necessary strength and rigidity. The tube-guard $b\ b'$ is adapted to be slipped upon the felly $a^2$ with a snug fit and to be detachably secured thereto by bolts $b^4$, as shown, so that the guard-ring or wheel-rim, with its associated parts, can be readily applied to or removed from the body of the wheel when necessary. The compound ring $b\ b'$ not only furnishes a seat for the pneumatic tube $c$, but it is provided with cheek-pieces $b^5$, which are extended outwardly from the center of the wheel, as shown, and are preferably curved in cross-section, so as to conform substantially to the pneumatic tube $c$ when the latter is in place. The edges or lips $b^6$ are preferably turned in toward each other somewhat and faced in parallel planes at right angles to the axis of the wheel to form between them an opening which is preferably of somewhat less width than the tube $c$.

Applied to the pneumatic tube $c$, which may be of ordinary construction, is a rigid ring $d\ d'$, fitting the pneumatic tire snugly when the latter is inflated and preferably formed in two parts $d$ and $d'$, respectively, the one part being seated upon the other, as shown at $d^2$, while the two parts are securely held together, as by bolts $d^3$. In the outer face of the compound rigid ring $d\ d'$, which may be of metal, wood, fiber, or other suitable material, is formed a recess for the reception of a shoe or tread portion $e$. The inclosing ring being formed in two parts, as shown, the opposing faces are ribbed or corrugated, as at $d^4$, so that the tread portion $e$ is clamped and held firmly between them when the two parts are bolted together. This shoe or tread portion is preferably formed of rubber in order that the wheel may be cushioned initially, and therefore noiseless. The compound ring $d\ d'$ fits freely between the lips $b^6$, so that proper clearance shall be afforded and free movement permitted, while dust and dirt are readily expelled.

In assembling the parts of the improved structure the ring member $b$ is first slipped upon the felly $a^2$ and may be secured in place thereon by the bolts $b^4$. The pneumatic tube $c$, partly inflated, if desired, is then put in place, together with the ring $d\ d'$ and the shoe or tread portion $e$, which is securely clamped between the parts of the ring, and the ring member $b'$ is then applied and secured in place by the bolts $b^3$. When the pneumatic tube is properly inflated, the parts under normal load are related, as clearly shown in Figs. 1 and 2, the tread portion $e$ protruding between the lips $b^6$. When, however, the wheel is subjected to excessive load or being in motion meets an obstruction, the pneumatic tube is distorted, and the ring $d\ d'$ and shoe or tread portion $e$ are pressed in between the lips $b^6$ of the supporting-rim in proportion to the load or shock. Should the load be so great as to endanger the pneumatic tube, the faces $b^7$ of the supporting-rim will make contact with the road-surface, being broadened for that purpose, and will prevent further distortion of the tube. Furthermore, as will be observed, whether the load be light or heavy all lateral thrusts are transmitted through the ring $d\ d'$ to the ring members $b\ b'$, which are of a form well adapted to resist such lateral pressure, and the pneumatic tube is thereby completely protected from injury from such lateral strains. At the same time the tube is preferably armored against puncture. It will also be observed that the extent of the pneumatic tube which is subjected to pressure under load is substantially one-half of the whole, being from five to seven times greater than the extent of the tube which would make contact with the road-surface if it were not protected by the ring $d\ d'$. The pneumatic tube will therefore perform properly its function although inflated to a much less degree than would be necessary if it made direct contact with the road-surface. For this reason and also because it is properly armored against puncture the tube may be made of much lighter material than is usually employed. Whatever dirt, mud, and water may enter within the supporting and protecting shell between the ring $d\ d'$ and the lips $b^6$ is immediately expelled through the pumping action of the tube and ring as the wheel rotates upon the road-surface. It will be observed, furthermore, that the rings and tube can be readily applied to and removed from any wheel of a given size, permitting repairs to be made quickly when required or a wheel of the given size to be quickly equipped with the cushioning devices.

It will be understood, of course, that the form of the parts may be varied as required to suit different conditions of use and that the invention is therefore not to be restricted to the particular form shown.

I claim as my invention—

A cushion-rim for a vehicle-wheel comprising a two-part supporting-ring with means to secure the parts together and having cheek-pieces extended outwardly and provided with bearing-surfaces for contact with the road-surface, a pneumatic tube seated in said supporting-ring a two-part rigid protecting-ring surrounding the tube between the edges of the cheek-pieces and provided with means to secure the parts together and a tread portion secured to said protecting-ring, substantially as described.

This specification signed and witnessed this 17th day of November, A. D. 1905.

JOHN THOMSON.

In presence of—
    HIRAM C. CROSS,
    WALTER C. BURKE.